United States Patent [19]
Shono

[11] Patent Number: 5,781,811
[45] Date of Patent: Jul. 14, 1998

[54] SHOCK ABSORBER OF MIRROR IN SINGLE LENS REFLEX CAMERA

[75] Inventor: Tetsuji Shono, Tokyo, Japan

[73] Assignee: Asahi Kogaku Kogyo Kabushiki Kaisha, Tokyo, Japan

[21] Appl. No.: 832,195

[22] Filed: Apr. 8, 1997

[30] Foreign Application Priority Data

Apr. 9, 1996 [JP] Japan ................................. 8-086609

[51] Int. Cl.$^6$ .................................................. G03B 19/12
[52] U.S. Cl. .................................. 396/358; 396/447
[58] Field of Search .............................. 396/354, 358, 396/447

[56] References Cited

U.S. PATENT DOCUMENTS

| | | | |
|---|---|---|---|
| 3,507,199 | 4/1970 | Sato | 396/447 |
| 3,653,311 | 4/1972 | Sato | 396/358 |
| 3,680,458 | 8/1972 | Nomura | 396/447 X |
| 3,738,246 | 6/1973 | Sato | 396/447 |
| 3,882,523 | 5/1975 | Uno et al. | 396/358 |
| 4,003,066 | 1/1977 | Shono | 396/358 |
| 4,068,246 | 1/1978 | Arai | 396/447 |
| 4,264,170 | 4/1981 | Kurei | 396/447 |
| 4,293,209 | 10/1981 | Kurei | 396/272 |
| 4,385,820 | 5/1983 | Shono | 396/447 |
| 4,730,200 | 3/1988 | Kitazawa | 396/447 |
| 5,257,052 | 10/1993 | Kurosaki et al. | 396/358 |
| 5,606,380 | 2/1997 | Tatamiya | 396/358 |

*Primary Examiner*—Howard B. Blankenship
*Attorney, Agent, or Firm*—Greenblum & Bernstein P.L.C.

[57] ABSTRACT

A shock absorber of a mirror in a single lens reflex camera having a mirror which rotates about a shaft to move between a viewing position and a retracted position includes a rotating member which rotates together with the mirror when the mirror rotates, a brake member which is rotatable about a shaft, a friction member which resists the rotation of the brake member, and an association member which is provided on the rotating member to rotate the brake member together with the rotating member in the same direction when the rotating member rotates in the forward or reverse direction, at the termination of the upward movement of the mirror from the viewing position to the retracted position or at the termination of the downward movement from the retracted position to the viewing position.

16 Claims, 3 Drawing Sheets

1

SHOCK ABSORBER OF MIRROR IN SINGLE LENS REFLEX CAMERA

BACKGROUND OF THE INVENTION

1. Field of the Invention

The present invention relates to a shock absorber for damping the motion of a mirror in a single lens reflex camera.

2. Description of the Related Art

A mirror (quick-return mirror) of a single lens reflex camera is movable between a viewing position, in which light transmitted through a photographing lens is made incident upon a finder system, and a retracted position in which the mirror is retracted from the photographing light path. A shock results when the mirror comes to an end point in its movement (i.e., the viewing position or the retracted position). Various types of shock absorbers have been proposed and used to damp the shock. For example, an air damper or a centrifugal governor have been used. However, in the conventional shock absorber, the movement of the mirror decelerates. There is, practically speaking no problem with deceleration of the movement of the mirror from the retracted position to the viewing position upon completion of the photographing operation. However, slow motion of the mirror from the viewing position to the retracted position increases the time lag between the operation of the release button and the commencement of the exposure, and hence a photographer may miss a photo opportunity.

SUMMARY OF THE INVENTION

It is an object of the present invention to provide a shock absorber which damps a shock of a mirror at the extreme upward and downward positions in its movements thereof without substantially reducing the operation speed (movement velocity) at portions other than the termination of the movement of the mirror.

To achieve the object mentioned above, according to the present invention, there is provided a shock absorber of a mirror in a single lens reflex camera having a mirror which rotates about a shaft to move between a viewing position in which light transmitted through a photographing lens reaches a finder system and a retracted position in which the mirror is retracted from the light path from the photographing lens to a film plane (exposure plane), comprising;

a rotating member which rotates together with the mirror when the mirror rotates;

a brake member which is rotatable about a shaft;

a friction member which resists the rotation of the brake member; and an association member which is provided on the rotating member to rotate the brake member together with the rotating member in the same direction when the rotating member rotates in the forward or reverse direction, at the termination of the upward movement of the mirror from the viewing position to the retracted position or at the termination of the downward movement from the retracted position to the viewing position.

The rotating member and the brake member can be provided on the same shaft to rotate relative to each other, or supported by separate shafts to rotate independently of each other.

The rotating member can be made of, for example, a gear which meshes with a gear provided on the shaft of the mirror or a mirror driving lever which drives the mirror.

According to an aspect of the present invention, there is provided a shock absorber of a mirror in a single lens reflex camera, comprising:

a shaft about which said mirror rotates to move between a viewing position in which light transmitted through a photographing lens reaches a finder system and a retracted position in which the mirror is retracted from the light path from said photographing lens to an exposure plane.

a rotating member which rotates in association with the rotation of said mirror;

a brake member which is rotatable and is coaxially supported with the rotating member;

a friction member which resists the rotation of the brake member;

a circumferential recess formed on the brake member; and an association pin which is provided on the rotating member and is located in said circumferential recess of the brake member;

wherein said association pin on the rotating member abuts one of the ends of the circumferential recess to rotate the brake member together with the rotating member in the same direction when the rotating member rotates in the forward or reverse direction, at the termination of the upward movement of the mirror from the viewing position to the retracted position or at the termination of the downward movement from the retracted position to the viewing position. The rotating member can be a gear which meshes with a gear provided on the shaft of the mirror, or it can be a mirror driving lever which drives the mirror.

The present disclosure relates to subject matter contained in Japanese Patent Application No.08-86609 (filed on Apr. 9, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
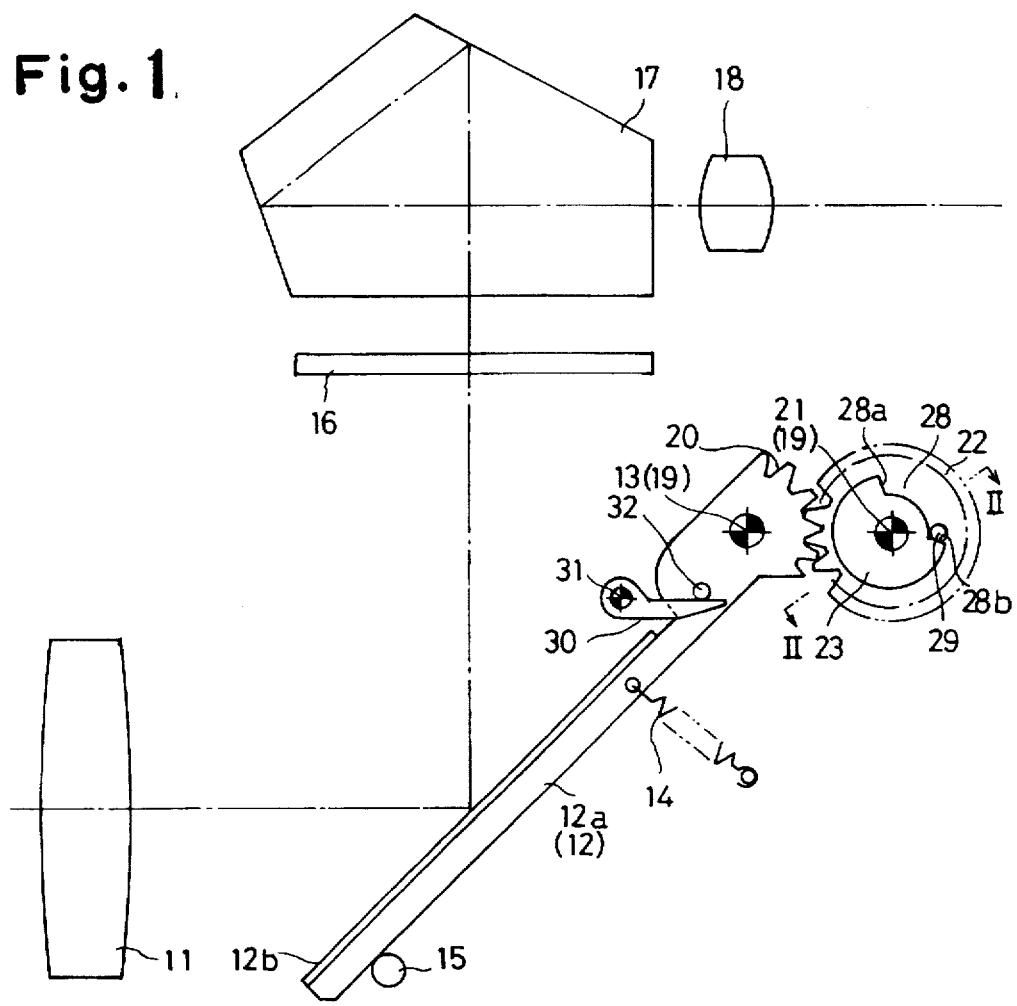
FIG. 1 is a side elevational view of a shock absorber of a mirror in a viewing position, according to a first embodiment of the present invention.
Figure 3:
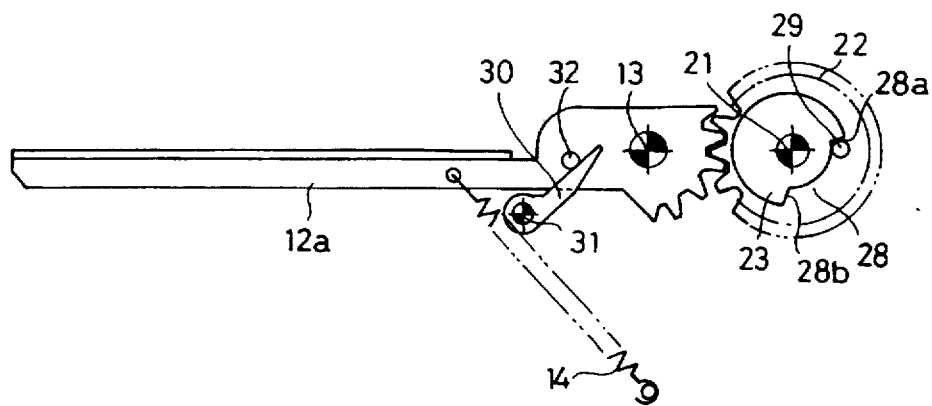
FIG. 3 is a side elevational view of a shock absorber of a mirror in the retracted position, according to the present invention.
Figure 2:
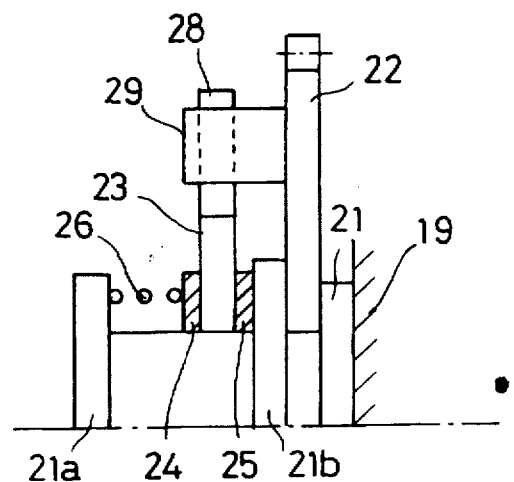
FIG. 2 is a sectional view taken along the line II—II in FIG. 1.

FIGS. 1 through 3 show the first embodiment of the present invention. A quick-return mirror 12 (hereinafter referred to as a mirror) provided behind a photographing lens 11 is provided with a mirror plate 12a which in turn is provided with a reflection mirror portion 12b. The mirror 12 is supported at its upper end to rotate about a shaft 13 which is provided in a mirror box 19 (see FIG. 2). The mirror 12 is biased downward by a tension spring 14. The downward movement of the mirror 12 is restricted by a stop pin 15. The lower position (extreme or end downward position in its movement) of the mirror 12 defines a viewing position in which object light transmitted through the photographing lens 11 is reflected by the reflection mirror portion 12b and is converged onto a focusing plate 16 to form an object image. A pentagonal prism (or pentagonal mirror) 17 and an eyepiece 18 are provided above the focusing plate 16, so that the object image can be viewed through the eyepiece 18. The upper position (extreme or end upward position in its movement) of the mirror 12 is restricted by a stop (not shown).

The mirror plate 12a is provided with an integrally formed sector gear 20, having a center is located on the axis of the shaft 13. The sector gear 20 meshes with a gear 22, rotatably supported by a shaft 21 which is provided in the mirror box 19. An annular brake disc 23 is attached to the shaft 21, coaxially with the gear 22, so as to rotate relative to the gear 22. The brake disc 23 is held between circular brake pads (friction plates) 24 and 25. The brake disc 23 and the brake pads 24 and 25 are interposed between flanges 21a and 21b integral with the shaft 21, and are pressed against the flange 21b by a compression coil spring 26 to resist the rotation of the annular brake disc 23. The annular brake disc 23 is provided on its outer peripheral surface thereof with a circumferentially extending cut-away sector (recess) 28 in which an association pin 29 provided on the gear 22 is engaged. The association pin 29 abuts against an end surface 28a or 28b of the recess 28 in accordance with the relative rotation of the gear 22 and the annular brake disc 23.

A mirror drive lever 30 is pivoted in the mirror box 19 about a shaft 31 and is rotated in the forward or reverse direction by a mirror drive mechanism (not shown). The mirror plate 12a is provided on its side surface thereof with a driven pin 32 which engages the mirror drive lever 30.

The apparatus constructed as above operates as follows.

In the viewing position shown in FIG. 1, when the shutter release button is depressed to rotate the mirror drive lever 30 about the shaft 31 in the counterclockwise direction, the mirror 12 is rotated about the shaft 13, via the driven pin 32 to the retracted position shown in FIG. 3. The rotation of the gear 22 is based on the movement of the sector gear 20, in association with the rotation of the mirror 12. Consequently, the association pin 29 of the gear 22 is moved in the recess 28, relative to the movement of the annular brake disc 23. The association pin 29 abuts against the end surface 28a of the recess 28 to rotate the annular brake disc 23 together with the gear 22 at the termination of the movement of the mirror 12 to the upper end position. Since the brake pads 24 and 25 and the compression coil spring 26 resist the rotation of the annular brake disc 23, the rotation of the mirror 12 is braked or decelerated at the termination of its upward movement. Thus, any shock at the upper end position of the mirror 12 is reduced or damped.

When the mirror 12 is rotated in the counterclockwise direction about the shaft 13 toward the lower position from the retracted position shown in FIG. 3, the gear 22 is rotated through the sector gear 20. Consequently, the association pin 29 of the gear 22 is moved in the recess 28 in the direction opposite to that of the upward movement of the mirror 12, and rotates relative to the annular brake disc 23. The association pin 29 abuts against the end surface 28b of the recess 28 to rotate the annular brake disc 23, together with the gear 22, immediately before the mirror 12 comes to the lower end position. Thus, the rotation of the mirror 12 is braked or decelerated at the termination of the downward movement thereof, and any shock at the lower end position of the mirror 12 is reduced or damped, similarly to the termination of the upward movement of the mirror. In the portions other than the extreme positions of the upward or downward movement of the mirror 12, the association pin 29 moves in the recess 28 without rotating the annular brake disc 23, and hence, the rotation of the mirror 12 is not braked. The angular displacement of the annular brake disc 23 relative to the gear 22 is reset when the mirror 12 is returned to the viewing position shown in FIG. 1. The above-mentioned operations are repeated every time the mirror 12 is moved upward or downward.

Figure 5:
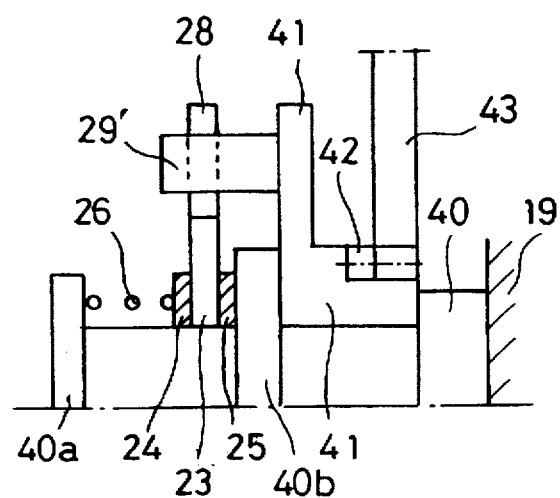
FIG. 5 is a sectional view taken along the line V—V in FIG. 4.
Figure 4:
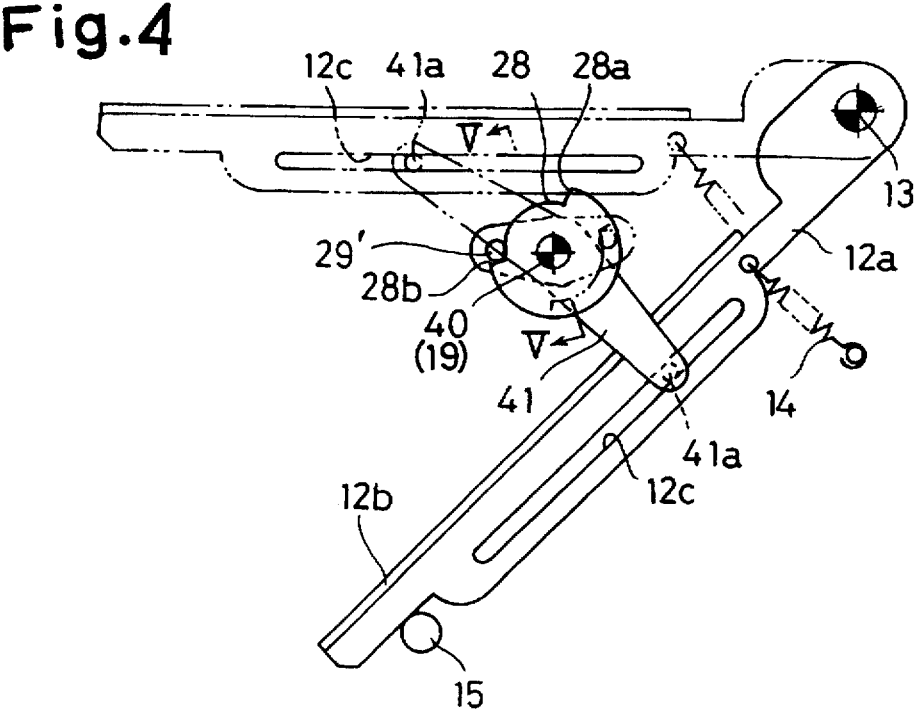
FIG. 4 is a side elevational view of a shock absorber of a mirror in the viewing position, according to a second embodiment of the present invention.

FIGS. 4 and 5 show a second embodiment of the present invention. In the second embodiment, a shock absorber is provided on the mirror driving mechanism. A mirror driving lever 41 is rotatably supported by a shaft 40 provided in the mirror box 19. A drive pin 41a is provided at the front end of the mirror driving lever 41, and is fitted in an elongated slot 12c formed in the mirror sheet 12a.

The mirror driving lever 41 is provided with a gear 42 which rotates about the shaft 40. The shaft 40 supports the annular brake disc 23, the brake pads 24 and 25, and the compression coil spring 26 between the flanges 40a and 40b, similarly to the first embodiment shown in FIGS. 1 through 3. The mirror driving lever 41 is provided with an association pin 29' whose function is the same as the association pin 29 in the first embodiment, and which is disposed in the recess 28 formed in the annular brake disc 23.

In the second embodiment, when the shutter release button is depressed to rotate the mirror driving lever 41 in the clockwise direction, via the drive gear 43, the rotation of the mirror 12 about the shaft 13 takes place through the engagement of the drive pin 41a and the elongated slot 12c toward the retracted position. The association pin 29' provided on the mirror driving lever 41 is moved in the recess 28 to rotate relative to the annular brake disc 23. The association pin 29' abuts the end surface 28a of the recess 28 to rotate the annular brake disc 23 immediately before the mirror 12 comes to the upper end position. Since the brake pads 24 and 25 and the compression coil spring 26 resist the rotation of the annular brake disc 23, the rotation of the mirror 12 is braked or decelerated at the termination of upward movement. Thus, any shock at the upper end position of the mirror 12 is reduced or damped.

When the mirror 12 is returned to the viewing position from the retracted position, the association pin 29' of the mirror driving lever 41 is moved in the recess 28, in the direction opposite to that of the upward movement of the mirror 12, and rotates relative to the annular brake disc 23. The association pin 29' abuts the end surface 28b of the recess 28 to rotate the annular brake disc 23 immediately before the mirror 12 comes to the lower end position. Thus, the rotation of the mirror 12 is braked or decelerated at the termination of its downward movement, and any shock at the lower end position of the mirror 12 is reduced or damped, similarly to the termination of the upward movement of the mirror. In the portions other than the extreme or end positions of the upward or downward movement of the mirror 12, the association pin 29' moves in the recess 28 without rotating the annular brake disc 23, and hence, the rotation of the mirror 12 is not braked.

In the above-mentioned embodiments, the annular brake disc 23 is provided coaxially to the rotating members (gear 22 and mirror driving lever 41) which rotate in association with the upward or downward movement of the mirror 12.

Figure 6:
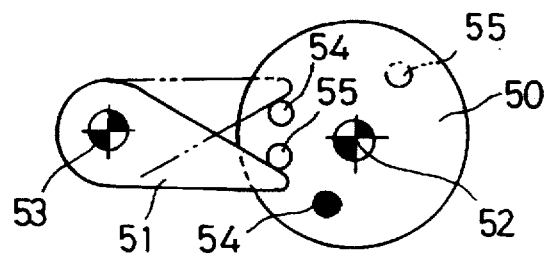
FIG. 6 is a side elevational view of main elements of a shock absorber of a mirror, according to a third embodiment of the present invention.

FIG. 6 shows a third embodiment of the invention in which a rotating member 50, which rotates in association with the upward or downward movement of the mirror 12, and a brake lever 51 are supported by separate shafts 52 and 53. The rotating member 50 corresponds to, for example, the gear 22 in FIG. 1 or the mirror driving lever 41 in FIG. 4. When the mirror 12 is moved between the viewing position and the retracted position, the rotating member 50 is rotated in the forward or reverse direction. The shaft 53 of the brake lever 51 which corresponds to the annular brake disc 23 is provided with a friction member (not shown) to resist the rotation thereof. The rotating member 50 is provided with two association pins 54 and 55 that engage with the brake member 51 at the termination of the upward or downward movement of the mirror 12 to rotate the same.

In the third embodiment, the mirror 12 is moved (rotated) about the shaft 13 toward the retracted position, the rotating member 50 rotates in the clockwise direction. Consequently, the association pin 54 provided on the rotating member 50 abuts the brake lever 51 to rotate the brake lever 51 immediately before the mirror 12 comes to the upper end position. The mirror 12 is braked or decelerated at the termination of upward movement due to the resistance of the rotation of the brake lever 51. Thus, any shock at the upper end position is damped or eliminated. When the mirror 12 is returned from the retracted position to the viewing position, the rotating member 50 is rotated in the counterclockwise direction. Consequently, the association pin 55 provided on the rotating member 50 abuts the brake lever 51 to rotate the brake lever 51 immediately before the mirror 12 comes to the lower end position. Thus, the mirror 12 is braked or decelerated at the termination of the downward movement thereof and any shock at the lower end position is damped or eliminated. In the portions other than the extreme positions of the upward or downward movement of the mirror 12, the association pin 54 or 55 does not engage with the brake member 51, and hence, the rotation of the mirror 12 is not braked.

As can be understood from the above discussion, the shock of the mirror at the termination of its upward or downward movement can be reduced or damped without reducing the operation speed of the mirror in the portions other than the termination of the upward or downward movement, by a simple, small and inexpensive shock absorber.

What is claimed is:

1. A shock absorber of a mirror in a single lens reflex camera having a mirror which rotates about a shaft to move between a viewing position in which light transmitted through a photographing lens reaches a finder system, and a retracted position in which the mirror is retracted from a light path between said photographing lens and an exposure plane, said shock absorber comprising:
   a rotating member which rotates together with the mirror about an axis spaced from a mirror rotation axis;
   a brake member which is rotatable about a brake shaft;
   a friction member which resists the rotation of the brake member; and
   an association member provided on the rotating member to rotate the brake member together with the rotating member and decelerate the mirror when the rotating member rotates in one of the forward and reverse direction, at one of the termination of the upward movement of the mirror from the viewing position to the retracted position and the termination of the downward movement of the mirror from the retracted position to the viewing position.

2. A shock absorber of a mirror according to claim 1, wherein the rotating member and the brake member are provided on the same shaft to rotate relative to each other.

3. A shock absorber of a mirror according to claim 2, wherein the rotating member is a gear which meshes with a gear provided on said shaft about which said mirror rotates.

4. A shock absorber of a mirror according to claim 2, wherein the rotating member is a mirror driving lever which drives the mirror.

5. A shock absorber of a mirror according to claim 1, wherein the rotating member and the brake member are supported by separate shafts.

6. A shock absorber of a mirror in a single lens reflex camera, said shock absorber comprising:
   a shaft about which said mirror rotates to move between a viewing position in which light transmitted through a photographing lens reaches a finder system and a retracted position which said mirror is retracted from a light path between said photographing lens and an exposure plane;
   a rotating member which rotates in association with the rotation of said mirror;
   a brake member which is rotatable and is coaxially supported with said rotating member;
   a friction member which resists the rotation of said brake member;
   a circumferential sector recess formed on said brake member; and
   an association pin which is provided on said rotating member and is located in said circumferential recess of said brake member;
   wherein said association pin on said rotating member abuts one of the ends of said circumferential sector recess to rotate said brake member together with said rotating member in the same direction when said rotating member rotates in one of the forward and reverse direction, and braking the mirror at one of the termination of the upward movement of said mirror from said viewing position to said retracted position and the termination of the downward movement of said mirror from said retracted position to said viewing position.

7. A shock absorber of a mirror according to claim 6, wherein said rotating member is a gear which meshes with a gear provided on said shaft about which said mirror rotates.

8. A shock absorber of a mirror according to claim 6, wherein said rotating member is a mirror driving lever which drives said mirror.

9. The shock absorber of a mirror according to claim 1, said rotating member rotating together with said mirror throughout an entire rotation range of said mirror.

10. The shock absorber of a mirror according to claim 1, said association pin moving into abutting relationship with a predetermined surface of said brake member immediately before said mirror reaches one of the end positions of a range of rotation of said mirror.

11. The shock absorber of a mirror according to claim 1, a rotating axis of said rotating member and a rotating axis of said mirror being positioned within a plane substantially normal to a plane including an optical path of light incident onto said mirror and light reflected by said mirror, when said mirror is in said viewing position.

12. The shock absorber of a mirror according to claim 1, said brake member, said rotating member, and said friction member being coaxially arranged about said brake shaft.

13. The shock absorber of a mirror according to claim 1, an angular displacement of said brake member with respect to said rotating member, when said mirror moves to said retracted position, is reset when said mirror moves to said viewing position.

14. A shock absorber of a mirror in a single lens reflex camera having a mirror which rotates about a shaft to move between a viewing position, in which light transmitted through a photographing lens reaches a finder system, and a retracted position, in which the mirror is retracted from a light path between the photographing lens and an exposure plane, said shock absorber comprising:

- a rotating member which rotates together with said mirror;
- a brake member which is rotatable about a brake shaft;
- a friction member which resists rotation of the brake member; and
- an association members provided on the rotating member, said association member rotating said brake member together with the rotating member when said rotating member rotates in one of the forward or reverse directions, at one of the termination of the upward movement of the mirror from the viewing position to the retracted position and the termination of the downward movement of the mirror from the retracted position to the viewing position, said association member comprising a pin secured to said rotating member and engaging said brake member at predetermined rotation positions of said mirror between said viewing position and said retracted position.

15. The shock absorber of a mirror according to claim 14, said rotating member comprising a gear which meshes with a gear provided on a shaft about which said mirror rotates.

16. The shock absorber of a mirror according to claim 15, wherein said rotating member comprises a mirror driving lever which drives said mirror.

* * * * *

UNITED STATES PATENT AND TRADEMARK OFFICE
CERTIFICATE OF CORRECTION

PATENT NO. : 5,781,811
DATED : July 14, 1998
INVENTOR(S) : Tetsuji SHONO

It is certified that error appears in the above-identified patent and that said Letters Patent is hereby corrected as shown below:

At column 5, line 59 (claim 1, line 15) of the printed patent, between "mirror" and "when", a --,-- should be inserted.

Signed and Sealed this

Eighth Day of February, 2000

Attest:

Q. TODD DICKINSON

Attesting Officer

Commissioner of Patents and Trademarks